United States Patent [19]

Stausebach et al.

[11] Patent Number: 4,808,370
[45] Date of Patent: Feb. 28, 1989

[54] CONNECTION OF A HOT GAS LINE TO THE CORE BARREL OF A GAS-COOLED HIGH-TEMPERATURE NUCLEAR REACTOR

[75] Inventors: Dieter Stausebach; Helmut Swars, both of Bergisch Gladbach, Fed. Rep. of Germany

[73] Assignee: Interatom GmbH, Bergisch-Gladbach, Fed. Rep. of Germany

[21] Appl. No.: 866,060

[22] Filed: May 21, 1986

[30] Foreign Application Priority Data

May 23, 1985 [DE] Fed. Rep. of Germany ........ 3518609

[51] Int. Cl.[4] ............................................. G21C 13/04
[52] U.S. Cl. ...................... 376/291; 285/47; 285/226; 376/260; 376/381
[58] Field of Search ............... 376/291, 292, 260, 381; 285/47, 226

[56] References Cited

U.S. PATENT DOCUMENTS

| 2,712,456 | 7/1955 | McCreery | 285/226 |
|---|---|---|---|
| 3,488,067 | 1/1970 | Sommer . | |
| 3,997,194 | 12/1976 | Eifer et al. | 285/226 |
| 4,023,832 | 5/1977 | Legille et al. | 285/226 |
| 4,047,742 | 9/1977 | Haferkamp et al. | 285/47 |
| 4,060,263 | 11/1977 | Kotcharian | 285/226 |
| 4,476,089 | 10/1984 | Müller-Frank et al. . | |
| 4,563,326 | 1/1986 | Ullrich et al. | 376/292 |

FOREIGN PATENT DOCUMENTS

| 0039016 | 11/1981 | European Pat. Off. . | |
|---|---|---|---|
| 0095662 | 12/1983 | European Pat. Off. . | |
| 2905614 | 8/1980 | Fed. Rep. of Germany | 285/47 |
| 2945877 | 5/1981 | Fed. Rep. of Germany | 285/47 |
| 3146305 | 5/1983 | Fed. Rep. of Germany | 285/226 |
| 3433180 | 4/1985 | Fed. Rep. of Germany | 285/47 |
| 3345457 | 6/1985 | Fed. Rep. of Germany . | |
| 1405820 | 6/1965 | France . | |
| 2034266 | 12/1970 | France . | |
| 2314978 | 1/1977 | France . | |

*Primary Examiner*—Deborah L. Kyle
*Assistant Examiner*—Richard W. Wendtland
*Attorney, Agent, or Firm*—Herbert L. Lerner; Laurence A. Greenberg

[57] ABSTRACT

A gas-cooled, high-temperature nuclear reactor includes a metallic core barrel, a graphite or carbon block lining disposed in the core barrel, a hot gas line including an outer pressure-confining metallic pipe and a ceramic flow guidance pipe, insulation separating the metallic pipe from the ceramic pipe, a stub concentric with the hot gas line, a device for detachably connecting the stub to the core barrel, the metallic pipe being tightly disposed in the stub, a device for detachably fastening the metallic pipe to the stub, a sleeve, a device for detachably fastening the sleeve to the lining, a bellows compensator being disposed in the stub and having one end tightly fastened to the stub and another end, and a device for connecting the other end to the sleeve.

6 Claims, 3 Drawing Sheets

CONNECTION OF A HOT GAS LINE TO THE CORE BARREL OF A GAS-COOLED HIGH-TEMPERATURE NUCLEAR REACTOR

The invention relates to a gas-cooled, high-temperature nuclear reactor with a metallic core barrel having a lining formed of graphite or carbon blocks, and a hot gas line having an outer metallic pipe for confining pressure and a ceramic flow guidance pipe separated therefrom by insulation.

Such a nuclear reactor is known from European Patent No. 0 039 016 and a further development is described in German Published, Non-Prosecuted Application DE-OS No. 33 45 457, corresponding to U.S. application Ser. No. 681,544, filed Dec. 14, 1984. Such hot gas lines have exhibited disadvantages stemming from the large temperature gradients, which will be described below.

It is accordingly an object of the invention to provide a connection of the hot gas line to the core barrel of a gas-cooled, high-temperature nuclear reactor, which overcomes the hereinaforementioned disadvantages of the heretofore-known devices of this general type.

This connection presents particular difficulties since it must withstand cooling gas which has been heated in the nuclear reactor to temperatures up to 950° C.; hot gas leaks that might occur at the connection could therefore endanger metallic components located in the vicinity thereof (for instance at the core barrel) In addition, leakage streams could lead to an erosion of the heat insulation material which is provided for the necessary temperature breakdown between the flow guidance pipe exposed to the hot gas temperature and a metallic pipe which surrounds the flow guidance pipe and provides a pressure seal. Due to the large temperature differences to which the components are subjected by the transition from the shut down to the operating phase, changes of position relative to each other which can be traced to different thermal expansion, must be expected; an angular offset between the core barrel and the hot gas line also occurs in this case, which would lead to excessive stresses if the two parts were rigidly connected to each other. In addition, it should be possible to replace components that have become defective, even under conditions of difficult access and if only remotely-controlled tools are used.

With the foregoing and other objects in view there is provided, in accordance with the invention, a gas-cooled, high-temperature nuclear reactor, comprising a metallic core barrel, a graphite or carbon block lining disposed in the core barrel, a hot gas line including an outer pressure-confining metallic pipe and a ceramic flow guidance pipe, insulation separating the metallic pipe from the ceramic pipe, a stub concentric with the hot gas line, means for detachably connecting the stub to the core barrel, the metallic pipe being tightly disposed in the stub, means for detachably fastening the metallic pipe to the stub, a sleeve, means for detachably fastening the sleeve to the lining, a bellows compensator being disposed in the stub and having one end tightly fastened to the stub and another end, and means for connecting the other end to the sleeve It is known to use bellows-type compensators for equalizing position changes of components. The structure according to the invention utilizes these properties while at the same time protecting the parts which are necessarily metallic from the temperature of the hot gas.

The joint produced in this manner is additionally completely gastight, and the gas-tightness thereof can be checked after installation without difficulty, since the hot gas line is only assembled later by a simple insertion into the stub Since the stub is detachably fastened to the core barrel it can be replaced, if necessary, tigether with the hot gas line, so that fit problems between these two parts after reassembly are avoided.

In accordance with another feature of the invention, the ceramic pipe and the sleeve are formed of carbon fiber-reinforced carbon. Thus, not only the flow guidance pipe but also the sleeve which serves for breaking down the temperature between the hot lining of the core barrel and the bellows is made of carbon reinforced with carbon fibers (also known under the designation CFC). This material has sufficient strength even at the high temperatures prevailing at that location and is protected against oxidation, i.e., burn-up, by the provision that it is used only in an inert gas atmosphere (for instance helium).

In accordance with a further feature of the invention, the stub and the bellows compensator define a space therebetween and the stub has openings formed therein and including a cold gas line coaxially surrounding the hot gas line. In nuclear reactors which are equipped like those described in the abovementioned publications, in other words with a cold gas line concentrically outside the hot gas line, the openings in the stub enclosing the bellows conduct a small shunt flow (in the order of 1/1000) of the cold gas to the outside of the bellows. This contributes to cooling the bellows, especially for compensating the temperatures which may vary over the periphery thereof.

In accordance with an added feature of the invention, the means for detachably fastening the sleeve to the lining are in the form of carbon screws reinforced with carbon fibers In accordance with an additional feature of the invention, the metallic pipe has an outer surface and the outer surface of the metallic pipe and the stub have regions of mutual contact, and including a coating disposed on the regions for preventing friction welding of the metallic pipe to the stub in the cooling gas atmosphere. This is done to ensure the later disassembly of the pressure pipe from the stub. Welding of the two parts together cannot be precluded in a helium atmosphere.

In accordance with again another feature of the invention, the stub has a flange to which the means for detachably fastening the stub to the core barrel are connected, the flange being offset or stepped back from the wall of the core barrel defining a gap therebetween for accomodating tools for cutting the fastening means. This is done in order to assure that the stub can be detached from the core barrel even if the basically detachable screws used for fastening can no longer be removed because they are welded fast or due to other reasons The cutoff stumps of the screws then remain in the core barrel and during reassembly, new tapped holes are cut in the core barrel which are offset by a given angle relative to the old ones.

In accordance with a concomitant feature of the invention, the means for detachably fastening the metallic pipe to the stub include means for making the fastening means accessible to removal by milling tools, preferably including the screws This is done since hot gas pipes and stubs may in some cases be replaced together. This raises no special problem, even when working from the inside of the flow guidance pipe.

Other features which are considered as characteristic for the invention are set forth in the appended claims.

Although the invention is illustrated and described herein as embodied in a connection of a hot gas line to the core barrel of a gas-cooled high-temperature nuclear rector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
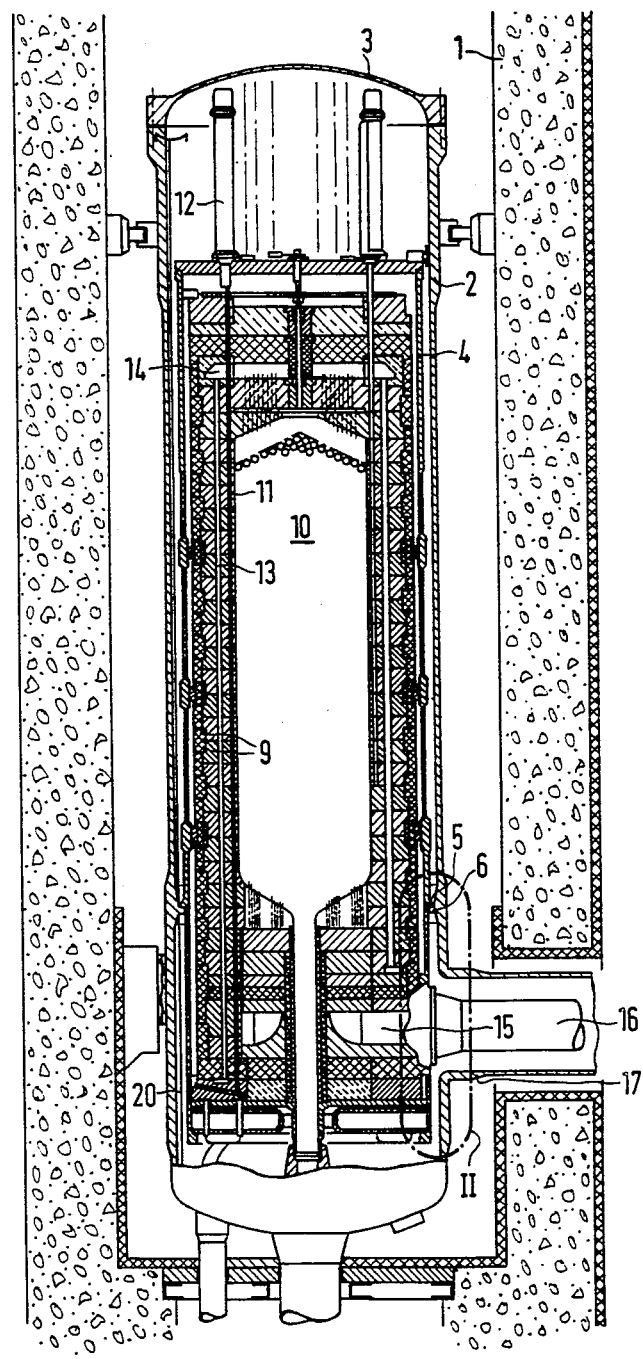
FIG. 1 is a fragmentary, diagrammatic, longitudinal, axial-sectional view of a nuclear reactor according to the invention.

Referring now to the figures in detail and first, particularly, to FIG. 1 thereof, there is seen a concrete structure serving as a radiation shield 1, inside of which a steel pressure vessel 2 is disposed. The pressure vessel is equipped with a removable cover 3 at the upper end thereof Disposed inside the pressure vessel 2 is a metallic core barrel 4, which has a circular projection 5 that rests on a circular flange 6 formed on the inside of the pressure vessel 2. The core barrel 4 contains a lining of built-in ceramic parts or internals 9 formed of carbon blocks and/or graphite which surround a space for receiving a fission zone 10 formed of a multiplicity of spherical fuel assemblies Among other things, canals 11 extend through the built-in parts 9. Absorber rods can be moved in the canals 11 by means of conventional drives 12 which are disposed at the ceiling of the core barrel 4, for controlling the fission zone The built-in parts 9 include other canals 13, through which cooling gas coming from non-illustrated heat sink is conducted into an upper plenum and is sent from the plenum through the fission zone 10 from the top down The heated cooling gas converging in a lower plenum 15 is fed to a non-illustrated heat sink through a hot gas line 16 disposed in a stub or connecting piece 17 of the pressure vessel 2.

Figure 2:
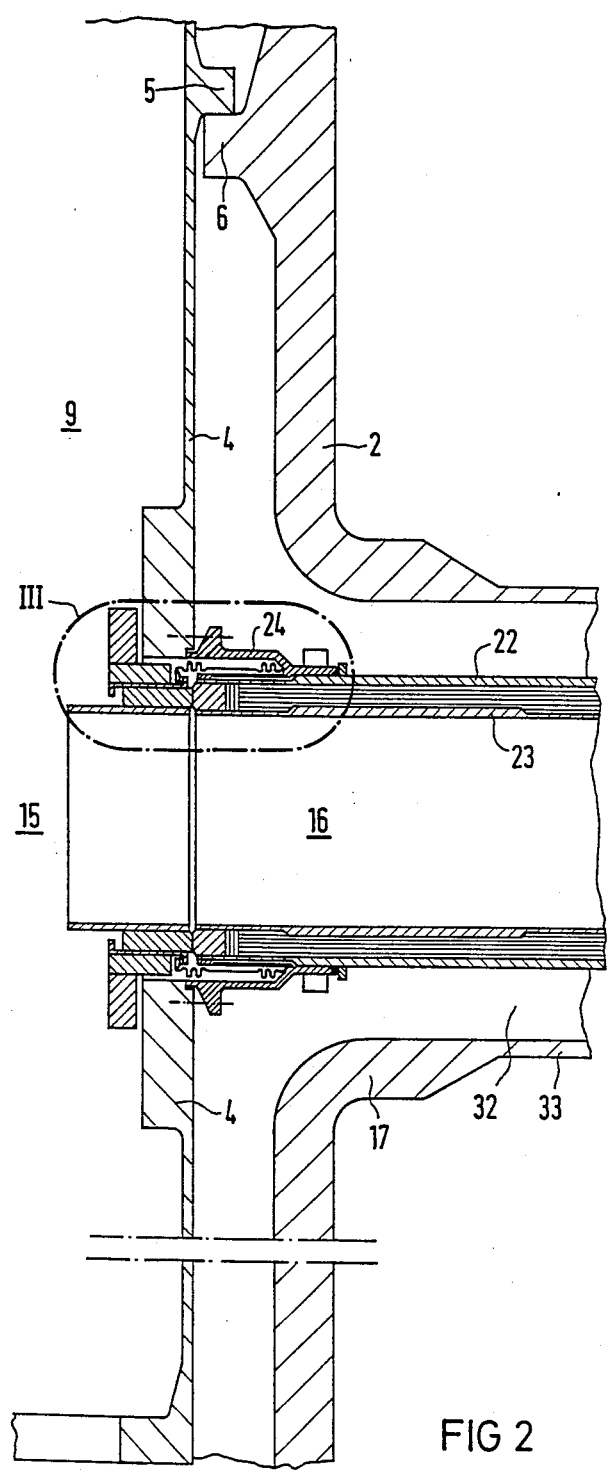
FIG. 2 is an enlarged view of the portion II of FIG. 1.
Figure 3:
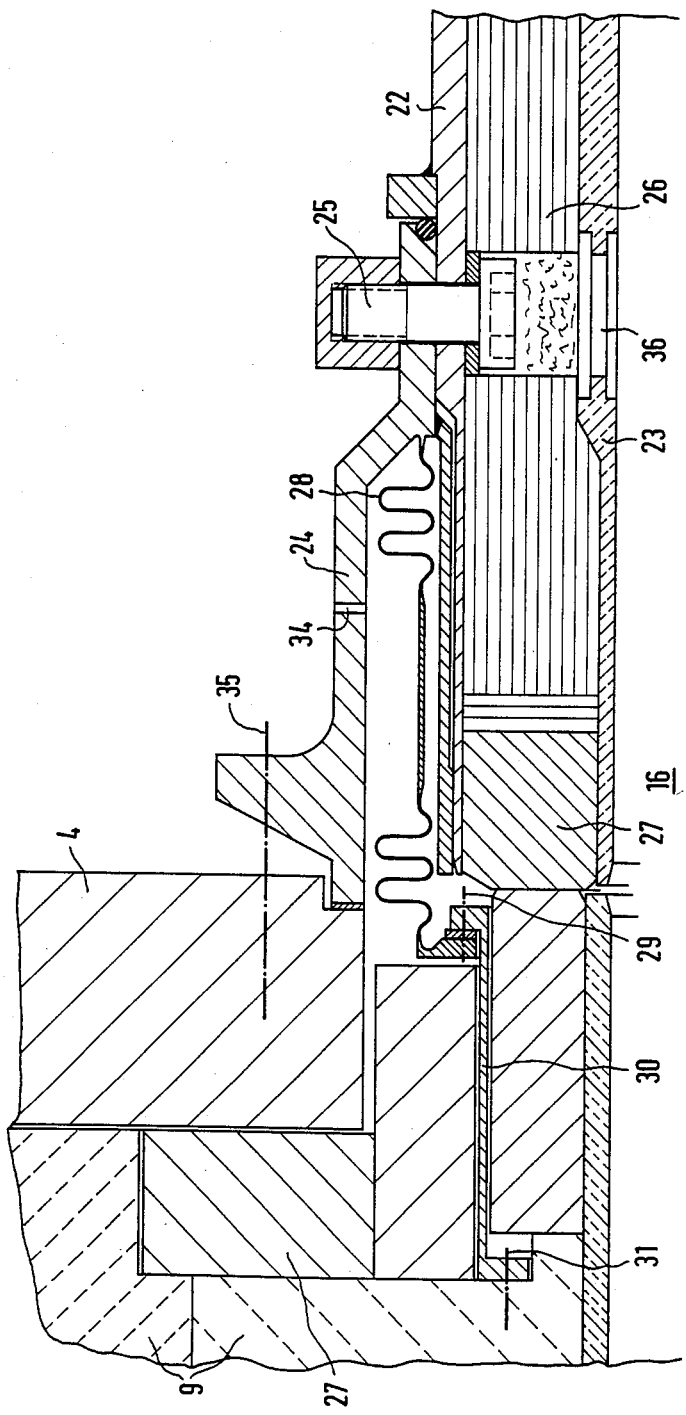
FIG. 3 is a further enlarged view of the portion III of FIG. 2.

As seen in FIG. 2, the hot gas line 16 includes an outer tight metallic pipe 22 The flow of the hot gas itself is guided by an inner pipe 23 which is concentric with the pipe 22 and is formed of carbon fiber-reinforced carbon The hot gas line 16 is inserted into a wider stub or connecting piece 24 which is fastened to the core barrel 4 and is fastened to the line 16 by a number of screws 25 distributed over the periphery, as seen in FIG. 3. The breakdown of the hot gas temperature which is as high as 950° C., to a level of about 300° C. which is peraissible for the pressure-carrying pipe 22, is accomplished by heat insulation which can be partially formed of a filamentary ceramic material 26 and partially (at particularl highly mechanically stressed points) of a highly porous solid ceramic 27. A bellows compensator 28 is disposed in the interior of the wider stub 24 and is tightly connected thereto The bellows compensator may be optionally formed of two parts that are joined together by a rigid intermediate part. The bellow:s compensator is connected by means of screws 29 to a sleeve 30, which is also formed of carbon fiberreinforced carbon The sleeve 30 is in turn fastened by means of further screws 31 formed of the same material, to the builtin graphite or carbon block parts of the core barrel 4. The temperature breakdown at the built-in parts 9 from the hot gas temperature to the temperature permissible for the bellows compensator 28, takes place by way of the sleeve 30 A displacement which may occur during operation due to temperature changes between the core barrel 4 and the hot gas line 16 (even in the vertical direction) is compensated by the bellows compensator 28, while at the same time tightness is maintained, so that hot gas leaks from the line 16 which could endanger the core barrel 4 do not take place The outside of the bellows compensator 28 is then cooled by part of the stream of the cooled gas which returns from the heat sink and flows in a space 32 between the hot gas line 16 and a cold gas line 33 which surrounds the line 16 coaxially and is connected to the stub 17. To this end, holes 34 are provided in the wider stub 24 The wider stub 24 is detachably fastened to the core barrel 4 by means of additional screws 35 distributed over the periphery. It can become necessary to detach the stub 24 if the hot gas line 16 is to be replaced because of damage. Due to the necesary close fit between the line 16 and the wider stub 24, it appears more advantageous to replace both parts together If the screws 35 cannot be loosened(such as because of mechanical bending or due to a weld in the thread) they can be cut off between the wall of the core barrel 4 and the flange of the wider stub 24, by means of non-illustrated cutting tools During the reassembly, new tapped holes are cut in the core barrel 4, offset at an angle thereto. During the disassembly of the gas line 16, insulating plugs 36 as well as the screws 25 covered by the plugs can be removed from the inside of the flow guiding inner pipe 23 by chip-producing or milling machinery. This can be done more easily with remotely controlled tools Undesirable friction welding of the pressure pipe 22 to the wider stub 24 in the hot helium atmosphere, is prevented by a suitable coating of these parts, such as with chromium carbide The advantage of the illustrated construction is that during installation the wider flange 24, the bellows compensator 28 and the sleeve 30 can be tested for leaks in a completely assembled condition, before the hot gas line 16 is placed in the wider stub 24.

The foregoing is a description corresponding in substance to German Application No. P 35 18 609.7, filed May 23, 1985, the International priority of which is being claimed for the instant application, and which is hereby made part of this application. Any material discrepancies between the foregoing specification and the aforementioned corresponding German application are to be resolved in favor of the latter.

We claim:

1. Gas-cooled, high-temperature nuclear reactor, comprising a metallic core barrel, a graphite or carbon block lining disposed in said core barrel, a hot gas line including an outer pressure-confining metallic pipe and a ceramic flow guidance pipe, insulation separating said metallic pipe from said ceramic pipe, a stub concentric with said hot gas line, means for detachably connecting said stub to said core barrel, said metallic pipe being tightly disposed in said stub, means for detachably fastening said metallic pipe to said stub, a sleeve, means for detachably fastening said sleeve to said lining, a bellow compensator being disposed in said stub and having one end tightly fastened to said stub and another end, and means for connecting said other end to said sleeve, said ceramic pipe and said sleeve being formed of carbon fiber-reinforced carbon.

2. Nuclear reactor according to claim 1, wherein said stub and said bellows compensator define a space therebetween and said stub has openings formed therein and including a cold gas line coaxially surrounding said hot gas line.

3. Nuclear reactor according to claim 1, wherein said means for detachably fastening said sleeve to said lining are in the form of carbon screws reinforced with carbon fibers.

4. Nuclear reactor according to claim 1, wherein said metallic pipe has an outer surface and said outer surface of said metallic pipe and said stub have regions of mutual contact, and including a coating disposed on said regions for preventing friction welding of said metallic pipe to said stub in a cooling gas atmosphere.

5. Nuclear reactor according to claim 1, wherein said stub has a flange to which said means for detachably fastening said stub to said core barrel are connected, said flange being offset from said core barrel defining a gap therebetween for accomodating tools for cutting said fastening means.

6. Nuclear reactor according to claim 1, wherein said means for detachably fastening said metallic pipe to said stub include means for making said fastening means accessible to removal by milling tools.

* * * * *